United States Patent
Chang et al.

(10) Patent No.: US 9,674,608 B2
(45) Date of Patent: Jun. 6, 2017

(54) VEHICLE, APPARATUS FOR GENERATING DRIVING SOUND OF VEHICLE, AND APPARATUS AND METHOD FOR CONTROLLING DRIVING SOUND OF VEHICLE

(71) Applicant: HYUNDAI MOTOR COMPANY, Seoul (KR)

(72) Inventors: Kyoung Jin Chang, Suwon-si (KR); Ju In Kim, Seongnam-si (KR); Enusoo Jo, Hwaseong-si (KR); Seonghyeon Kim, Anyang-si (KR); Dong Chul Park, Anyang-si (KR); Seok Gwan Hong, Gwangmyeong-si (KR); Ki Woong Jeong, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 138 days.

(21) Appl. No.: 14/564,039

(22) Filed: Dec. 8, 2014

(65) Prior Publication Data

US 2016/0101726 A1 Apr. 14, 2016

(30) Foreign Application Priority Data

Oct. 1, 2014 (KR) .......................... 10-2014-0132362

(51) Int. Cl.
*H04R 3/04* (2006.01)
*G10K 15/02* (2006.01)
(Continued)

(52) U.S. Cl.
CPC ................. *H04R 3/04* (2013.01); *B60Q 9/00* (2013.01); *G10K 15/02* (2013.01); *G10L 25/18* (2013.01); *H04R 2499/13* (2013.01)

(58) Field of Classification Search
CPC ...... G10K 15/02; H04R 3/04; H04R 2499/13; B60Q 9/00; G10L 25/18
(Continued)

(56) References Cited

U.S. PATENT DOCUMENTS

| 5,855,004 A * | 12/1998 | Novosel ................. A63H 19/14 |
| | | 105/1.5 |
| 2011/0010269 A1* | 1/2011 | Ballard ................. B60Q 5/008 |
| | | 705/26.41 |

FOREIGN PATENT DOCUMENTS

| JP | 2012-151855 A | 8/2012 |
| JP | 2012-166662 A | 9/2012 |

(Continued)

OTHER PUBLICATIONS

Korean Office Action dated Apr. 30, 2015 issued in Korean Patent Application No. 10-2014-0132362 (partial English translation).

(Continued)

*Primary Examiner* — David Ton
(74) *Attorney, Agent, or Firm* — McDermott Will & Emery LLP (57) ABSTRACT

Disclosed are a vehicle, an apparatus for generating a driving sound of the vehicle, and an apparatus and method for controlling a driving sound of the vehicle. The present invention intends to provide a driving sound of a vehicle having a characteristic desired by a driver. The vehicle according to an embodiment of the present invention includes: a voice signal input unit configured to receive a voice signal; a filter generation unit configured to extract a characteristic of the voice signal and generate a driving sound filter considering the characteristic of the voice signal; and a driving sound control unit configured to generate a default driving sound based on a driving state of the vehicle
(Continued)

and generate a new driving sound obtained by applying the driving sound filter to the default driving sound.

17 Claims, 8 Drawing Sheets

(51) Int. Cl.
*B60Q 9/00* (2006.01)
*G10L 25/18* (2013.01)

(58) Field of Classification Search
USPC .................................. 381/86, 98, 101; 446/7
See application file for complete search history.

(56) References Cited

FOREIGN PATENT DOCUMENTS

| | | |
|---|---|---|
| JP | 2013-131957 A | 7/2013 |
| JP | 2013-223031 A | 10/2013 |
| KR | 10-2009-0116320 A | 11/2009 |
| KR | 10-2010-0072842 A | 7/2010 |
| KR | 10-1081159 B1 | 11/2011 |

OTHER PUBLICATIONS

U.S. Office Action dated Jan. 10, 2017 issued in U.S. Appl. No. 15/253,445.

\* cited by examiner

VEHICLE, APPARATUS FOR GENERATING DRIVING SOUND OF VEHICLE, AND APPARATUS AND METHOD FOR CONTROLLING DRIVING SOUND OF VEHICLE

CROSS-REFERENCE TO RELATED APPLICATION

This application claims the benefit of priority to Korean Patent Application No. 10-2014-132362, filed on Oct. 1, 2014 in the Korean Intellectual Property Office, the disclosure of which is incorporated herein by reference.

1. Field

Embodiments of the present invention relate to a vehicle, and more particularly, to a control of a driving sound of a vehicle.

2. Background

Noise of a vehicle is a disturbance that distracts the concentration of a driver and causes an indoor environment to be unpleasant. However, on the other hand, the noise is one of the important elements, which may provide emotional satisfaction that allows a driver to feel dynamics of the vehicle and enables the driver to feel momentum and maneuverability of the vehicle, Accordingly, even upon developing an electric vehicle with almost no noise and vibration, devices configured to artificially generate and provide an appropriate vehicle noise according to a driver's taste and preference have been developed and presented. Furthermore, some vehicle enthusiasts invest time and money in implementing a unique engine sound of a specific model in their vehicles and put much effort to synthesize their preferred sound timbre.

SUMMARY

An aspect of the present inventive concept provides a driving sound of a vehicle having a characteristic desired by a driver.

In accordance with one aspect of the present invention, the vehicle includes: a voice signal input unit configured to receive a voice signal; a filter generation unit configured to extract a characteristic of the voice signal and generate a driving sound filter considering the characteristic of the voice signal; and a driving sound control unit configured to generate a default driving sound based on a driving state of the vehicle and generate a new driving sound obtained by applying the driving sound filter to the default driving sound.

The filter generation unit may include a filter synthesis unit configured to generate the driving sound filter using at least one resonance frequency of the voice signal; and a filter storage unit configured to store the driving sound filter.

The filter synthesis unit may select the at least one resonance frequency of the voice signal through spectral analysis of the voice signal.

The driving sound control unit may include a driving state detection unit configured to detect a driving state of the vehicle.

The driving state detection unit may include at least one of a revolutions-per-minute (RPM) sensor, a torque sensor, a throttle position sensor, an accelerator position sensor, and a wheel speed sensor.

The driving sound control unit may further include a control unit configured to control generation of the default driving sound and generation of the new driving sound.

A level of the new driving sound may be adjusted by adjusting decibels of the driving sound filter.

The voice signal input unit may be a microphone.

The microphone may be a hands-free microphone.

The microphone may be a voice control microphone for inputting a voice.

The microphone may be a microphone of a mobile communication terminal.

The driving sound filter may be a finite impulse response (FIR) filter.

The driving sound filter may be an infinite impulse response (IIR) filter.

The voice signal may be a cry of a pet.

The voice signal may be a cry of a wild animal.

In accordance with another aspect of the present invention, a driving sound filter generation device of a vehicle includes: a filter synthesis unit configured to extract a characteristic of a voice signal from at least one resonance frequency of the voice signal to generate a driving sound filter; and a filter storage unit configured to store the driving sound filter.

The filter synthesis unit may select the at least one resonance frequency of the voice signal through spectral analysis of the voice signal.

A level of the new driving sound may be adjusted by adjusting decibels of the driving sound filter.

In accordance with still another aspect of the present invention, a driving sound control device of a vehicle includes: a driving state detection unit configured to detect a driving state of the vehicle; and a control unit configured to generate a default driving sound based on the driving state of the vehicle and generate a new driving sound obtained by applying a previously provided driving sound filter to the default driving sound.

The driving state detection unit may include at least one of a revolutions-per-minute (RPM) sensor, a torque sensor, a throttle position sensor, an accelerator position sensor, and a wheel speed sensor.

A level of the new driving sound may be adjusted by adjusting decibels of the driving sound filter.

In accordance with still another aspect of the present invention, a method of controlling a driving sound of a vehicle, the method includes: receiving a voice signal; extracting a characteristic of the received voice signal and generating a driving sound filter considering the characteristic of the voice signal; and generating a default driving sound based on a driving state of the vehicle and generating a new driving sound obtained by applying the driving sound filter to the default driving sound.

The driving sound filter may be generated using at least one resonance frequency of the voice signal.

The method may further include storing the driving sound filter.

At least one resonance frequency of the voice signal may be selected through spectral analysis of the voice signal.

A level of the new driving sound may be adjusted by adjusting decibels of the driving sound filter.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout.

Figure 1:
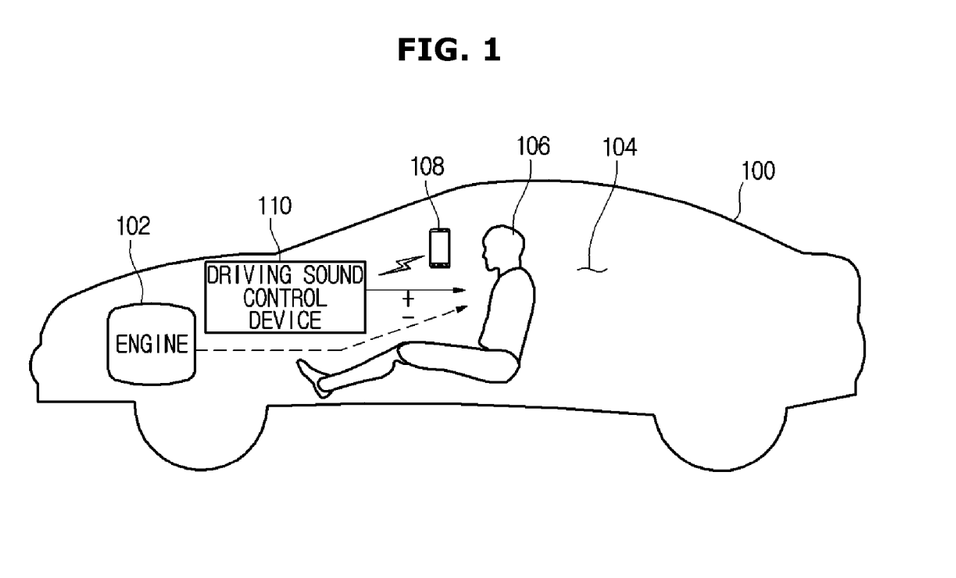
FIG. 1 is a view showing a vehicle according to an embodiment of the present invention.

FIG. 1 is a view showing a vehicle according to an embodiment of the present invention. A vehicle 100 moves by rotating its wheels due to driving power generated by a driving engine 102. When the engine 102 is driven, an engine sound is generated by the engine 102 (an arrow depicted as a dashed line) and introduced into a passenger compartment 104. The passenger compartment 104 is an area of a vehicle intended for the seating of a driver 106. An engine sound generated by the engine 102 may be different from that desired by the driver 106. The vehicle 100 according to an embodiment of the present invention generates a driving sound desired by the driver 106 through a driving sound control device 110 and provides the generated driving sound to the passenger compartment 104, thus providing a driving sound satisfying a requirement of the driver 106.

In FIG. 1, a mobile terminal, designated by reference numeral 108, may be a smartphone or table PC, a pad-type terminal, or a notebook. In the vehicle 100 according to an embodiment of the present invention, the driver 106 may start an operation needed to generate the driving sound through an application running on the mobile terminal 108. Alternatively, the driver 106 may start the operation needed to generate the driving sound by using at least one predetermined button that is provided to the vehicle 100.

Figure 2:
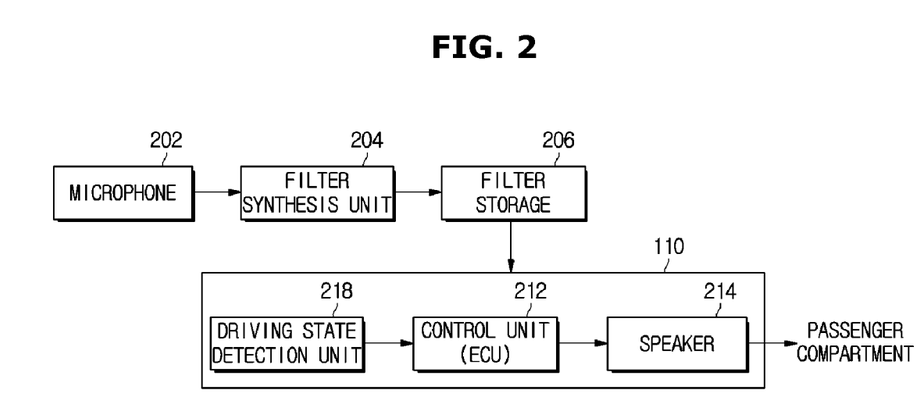
FIG. 2 is a block diagram showing a control system for generating a driving sound of a vehicle according to an embodiment of the present invention.

FIG. 2 is a block diagram showing a control system for generating a driving sound of a vehicle according to an embodiment of the present invention. As shown in FIG. 2, a control system for generating a driving sound of a vehicle according to an embodiment of the present invention may include a microphone 202, a filter generation unit 210, and a driving sound control device 110.

The microphone 202 is an example of a voice signal input unit, which is used to receive a voice signal. The microphone 202 may be a hands-free microphone of the vehicle 100. Alternatively, the microphone 202 may be a microphone used to receive a voice signal of the driver 106 to perform voice recognition-based control of the vehicle 100. If a system for the voice recognition-based control is provided to the vehicle 100, a device for analyzing a voice signal to perform voice recognition may be provided. In this case, spectral analysis of a voice signal according to an embodiment of the present invention may be carried out using the device for analyzing a voice signal, without a separate voice signal analyzer. Alternatively, the microphone 202 may be a microphone of the mobile terminal 108.

A voice signal received through the microphone 202 is a human voice signal. For example, the voice signal may be a voice of someone including the driver 106. Alternatively, the voice signal is a cry of a pet. A driving sound filter considering a cry of a pet (for example, a dog or a cat) raised by the driver 106 may be generated by inputting the cry of the pet through the microphone 202. Alternatively, the voice signal is a cry of a wild animal. A driving sound filter considering a cry of a specific wild animal (for example, a tiger or leopard) may be generated by acquiring the cry of the animal and inputting the acquired sound through the microphone 202.

A sound source of a voice wave form is classified into periodic vibration of the vocal cords due to continuous opening and closing of a glottis and noisy air vibration caused by blowing air to a narrow space formed by a tongue, teeth, a lip, and the like in a mouth. The vocal-cord-vibration-based sound source includes a basic vibration sound and harmonic sounds whose frequency is an integer multiple of the basic vibration sound. A basic frequency of the vocal cord vibration is inversely proportional to a length of the vocal cords, is proportional to the square root of a tension of the vocal cord times the acceleration of gravity, and is inversely proportional the square root of a specific gravity of the vocal cords times a cross-section of the vocal cords. Vowel sounds and voiced consonant sounds are generated by resonating a vocal tract in which periodic air vibration due to the vocal cords, that is a sound source, is a resonance system. In the vocal cord vibration, each harmonic has different amplitudes, and several harmonics are strengthened by resonance characteristics of the vocal tract. The resonance characteristics of the vocal tract work as a filter. Thus, the harmonics are strengthened at some frequencies and weakened at other frequencies according to a size and a shape of the vocal tract, that is, a length of the oral cavity, a narrowing point in the vocal tract, a degree of opening of the vocal tract, and the like. When a sound is generated while there is not a narrowing point in the middle of the vocal tract, a resonance frequency of the generated sound is similar to a case in which the vocal tract is a cylinder pipe having one closed end, and a wavelength of the lowest resonance wave is 4 times as long as the length of vocal tract. Change in a shape of an oral cavity due to movement of a tongue and a chin leads to a change in the length of the vocal tract. Among organs of speech, an articulatory organ includes a pharynx, an esophagus, a uvula, a hard palate, a tongue, lips, etc. and a resonance organ includes sound-producing organs including the pharynx, oral cavity, and a nasal cavity. In general, a voice spectrum is represented as a spectrum of the vocal cord sound times frequency response characteristics of the vocal tract. As such, since the resonance characteristics of the vocal tract work as a filter and thus the harmonics are strengthened at some frequencies and weakened at other frequencies according to a size and a shape of the vocal tract, that is, a length of the oral cavity, a narrowing point in the vocal tract, a degree of opening of the vocal tract, and the like, characteristics of voice signals of people having different vocal cord structures may be variously exhibited. Furthermore, similar to humans, pets or wild animals also have the difference between characteristics of voice signals due to the difference between vocal cord structures. The vehicle 100 according to an embodiment of the present invention may generate and output a unique and distinctive driving sound of the vehicle 100 desired by the driver 106 in consideration of characteristics of a unique voice signal of a human, pet, or wild animal, thus satisfying a requirement of the driver 106.

The filter generation unit 210 is used to extract a characteristic of a voice signal to generate a driving sound filter considering the characteristic of the voice signal. To this, the filter generation unit 210 includes a filter synthesis unit 204 and a filter storage unit 206. The filter synthesis unit 204 is used to perform spectral analysis on a voice signal (for example, a voice of driver 106) received through the microphone 202 and select at least one main resonance frequency of the voice signal. In order to more accurately extract the characteristic of the voice signal, the filter synthesis unit 204 may select more main resonance frequencies. As such, the filter synthesis unit 204 may extract the main characteristic of the voice signal through the spectral analysis and the selection of the main resonance frequency. The filter synthesis unit 204 may generate a driving sound filter considering the characteristic of the voice signal when the selected main resonance frequency is used. The driving sound filter may be a finite impulse response (FIR) filter. The driving sound filter may be an infinite impulse response (IIR) filter. The filter storage unit 206 is used to store a completed driving sound filter. A driving sound filter stored in the filter storage unit 206 may adjust a level of a target driving sound by adjusting an amplitude (in decibels) of a resonance frequency.

The driving sound control unit 110 generates a default driving sound based on a driving state of a vehicle and generates a new driving sound in which the driving sound filter is applied to the default driving sound. To this, the driving sound control unit 110 includes a driving state detection unit 218 and a control unit 212. The driving sound control unit 110 may further include a speaker 214. The driving state detection unit 218 acquires driving state information of the vehicle 100 and provides the acquired driving state information to the control unit 212. The driving state detection unit 218 will be described in detail below with reference to FIG. 3. The control unit 212 generates a default driving sound considering a driving state of the running vehicle 100 on the basis of driving state information of the vehicle 100 that is provided from the driving state detection unit 218. Here, the default driving sound may be selected from among a plurality of default driving sounds that are previously provided in consideration of various driving states of the vehicle 100. Alternatively, the default driving sound may be generated in consideration of the current driving state of the vehicle 100 in real time. The control unit 212 passes the default driving sound to a driving sound filter of the filter storage unit 206 to generate a new driving sound by applying a characteristic of the driving sound filter to the default driving sound. An example of the control unit is an electronic control unit (ECU) for electronically controlling the vehicle 100.

The speaker 214 is used to output a new driving sound generated by the driving sound control unit 110, and may be, for example, an audio device provided in the vehicle 100 or a speaker provided in a multimedia device, a navigation device, and the like.

Figure 3:
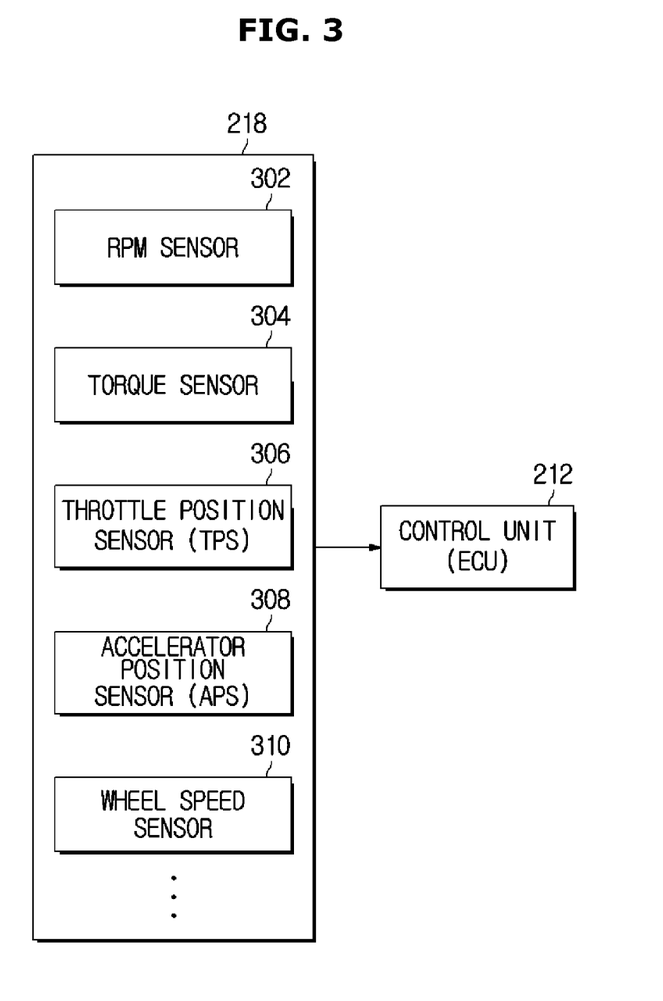
FIG. 3 is a block diagram showing a configuration of a driving state detection unit as shown in FIG. 2.

FIG. 3 is a block diagram showing a configuration of a driving state detection unit as shown in FIG. 2. As shown in FIG. 3, the driving state detection unit 218 may include a revolutions-per-minute (RPM) sensor 302, a torque sensor 304, a throttle position sensor 306, an accelerator position sensor 308, and a wheel speed sensor 310.

The RPM sensor 302 is a sensor used to detect revolutions per minute (RPM) of the engine 102 and generates a corresponding number of pulses to the number of cylinders of the engine 102 per one revolution. For example, the RPM sensor 302 generates four pulses per one revolution for a four-cylinder engine, six pulses per one revolution for a six-cylinder engine, and three pulses per one revolution for a three-cylinder engine. The control unit 212 determines the number of revolutions of the engine 102 by using the number of pulses per minute that are generated by the RPM sensor 302.

The torque sensor 304 is a sensor used to detect a torque of the engine 102. The control unit 212 may determine a degree of load of the engine 102 through the torque sensor 304.

The throttle position sensor 306 is a sensor used to detect a position of a throttle valve according to an operation (acceleration) of an accelerator pedal by a driver. The throttle position sensor 306 is a variable resistor element that rotates with a throttle shaft of a throttle body, and detects the position of the throttle valve. A resistance of the throttle position sensor 306 varies depending on the rotation of the throttle valve and thus an output voltage of the throttle position sensor 306 changes. The control unit 212 determines the position of the throttle valve through the change in the output voltage. The control unit 212 determines an operation mode of the engine 102 from information such as the output voltage (that is, the position of the throttle valve) and an engine rotation number. Furthermore, the control unit 212 may allow a vehicle driving sound appropriate for an operation mode of the engine 102 to be generated by determining a driving control value of a vibration generator 214 according to the position of the throttle valve, The accelerator position sensor 308 is a sensor used to detect an amount of operation of the accelerator pedal. That is, if the amount is set as 0% when the driver 106 does not press the accelerator pedal, and set as 100% when the driver 106 presses the accelerator pedal to the floor, the accelerator pedal sensor recognizes the amount of operation of the accelerator pedal by the driver 106 as a value between 0% and 100%. The accelerator position sensor 308 is a set of two sensors: one is used to detect the amount of operation of the accelerator pedal, and the other is used to detect (monitor) a failure.

The wheel speed sensor 310 is a sensor used to detect a speed of revolutions of a wheel of the vehicle 100.

The control unit 212 receives detection values from the RPM sensor 302, the torque sensor 304, the throttle position sensor 306, the accelerator position sensor 308, and the wheel speed sensor 310 included in the driving state detection unit 218 and controls running of the vehicle 100. The driving state detection unit 218 may further include another sensor in addition to the RPM sensor 302, the torque sensor 304, the throttle position sensor 306, the accelerator position sensor 308, and the wheel speed sensor 310. In addition, the control unit 212 generates a default driving sound considering a current driving state of the vehicle 100 on the basis of the driving state information of the vehicle 100. A new driving sound is generated by passing the default driving sound to the driving sound filter according to an embodiment of the present invention before the default driving sound is output through the speaker 214, and then output through the speaker 214.

Figure 4:
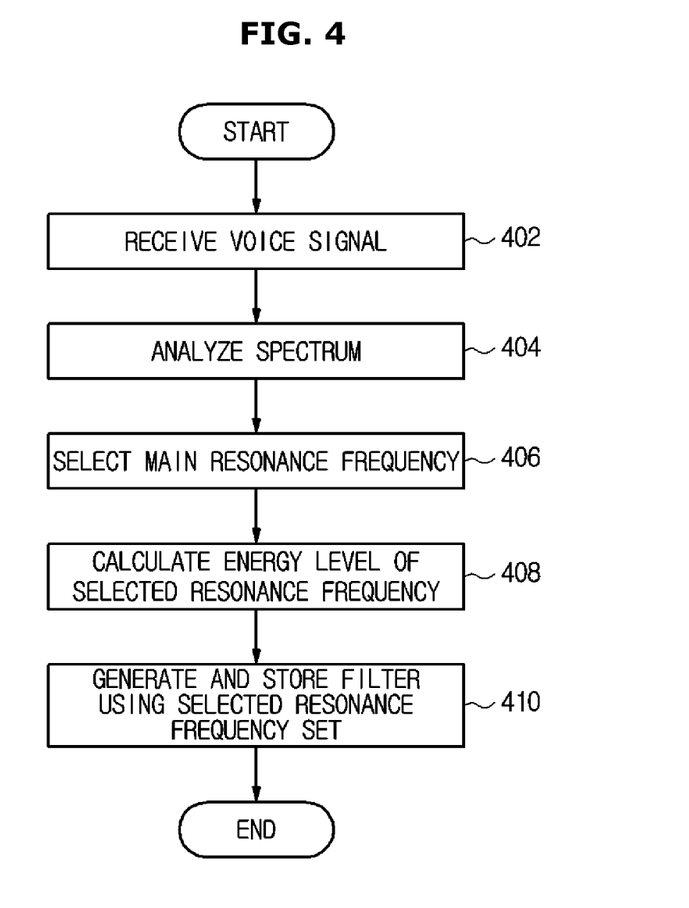
FIG. 4 is a flowchart showing a method of generating a driving sound filter in controlling a driving sound of a vehicle according to an embodiment of the present invention.

FIG. 4 is a flowchart showing a method of generating a driving sound filter in controlling a driving sound of a vehicle according to an embodiment of the present invention. As shown in FIG. 4, the method includes first receiving a voice signal through a microphone 202 that is a voice signal input unit in order to generate a driving sound filter considering a characteristic of the voice signal (402). The voice signal is a voice of a driver 106 or someone else or a cry of a pet or wild animal. When the voice signal is received, a filter synthesis unit 204 performs spectral analysis on the received voice signal (404). The filter synthesis unit 204 selects at least one main resonance frequency of the voice signal from a result of the spectral analysis performed on the received voice signal (406). In order to generate a driving sound filter having a better quality, it is preferable to select more main resonance frequencies. It will be described in detail below with reference to FIG. 5. When at least one main resonance frequency is selected, the filter synthesis unit 204 calculates an energy level of the selected main resonance frequency (408). The filter synthesis unit 204 uses the selected main resonance frequency to generate a driving sound filter considering the characteristic of the voice signal and stores the main driving sound filter in the filter storage unit 206 (410). As such, the driving sound filter stored in the filter storage unit 206 is provided to the driving sound control unit 110 and used to generate a driving sound desired by the driver 106 when the driver 106 desires the new driving sound considering the characteristic of the voice signal while the vehicle 100 is running.

Figure 5A:
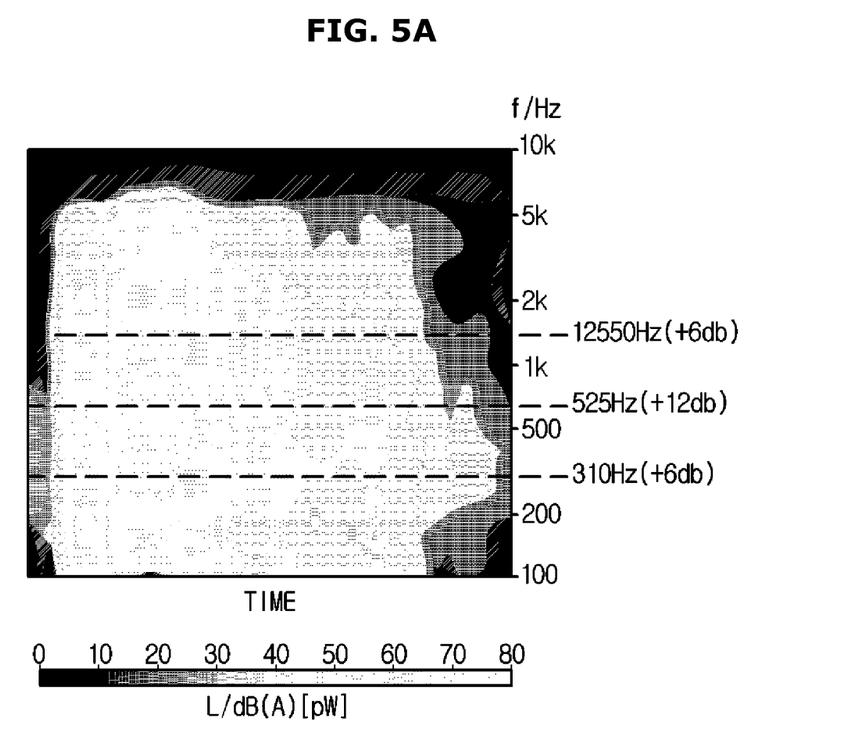
FIGS. 5A and 5B are views showing selection of a main resonance frequency and generation of a filter through spectral analysis.
Figure 5B:
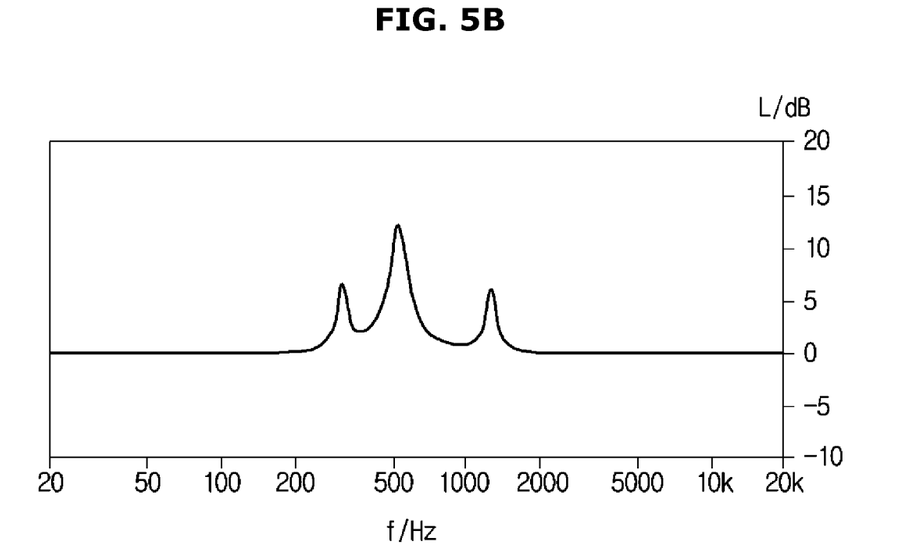

FIGS. 5A and 5B are views showing selection of a main resonance frequency and generation of a filter through spectral analysis. First, FIG. 5A shows a spectrum of the received voice signal. In FIG. 5A, a horizontal axis indicates time, a vertical axis indicates frequency, and brightness of shadow indicates an energy level. The energy level is higher as the shaded area is brighter, and the energy level is lower as the shaded area is darker. As seen from FIG. 5A, the energy level around about 525 Hz is about 12 dB, which is the highest level. In addition, the energy levels around about 310 Hz and about 1250 Hz are about 6 dB, which is the second highest level. As the result of the spectral analysis, a driving sound filter having a characteristic as shown in FIG. 5B may be generated by selecting 525 Hz, 310 Hz, and 1250 Hz as the main resonance frequencies and then combining the frequencies. It can be seen through the characteristic of the driving sound filter of FIG. 5B that 525 Hz, 310 Hz, and 1250 Hz are the main resonance frequencies.

As such, the number and bands of main resonance frequencies may vary depending on a vocal cord structure of a provider of the voice signal. For example, voice signals of humans and animals have respective different unique characteristics because of a difference between vocal cord structures of humans and animals, and the difference may be acquired through spectral analysis of the voice signals.

Figure 6:
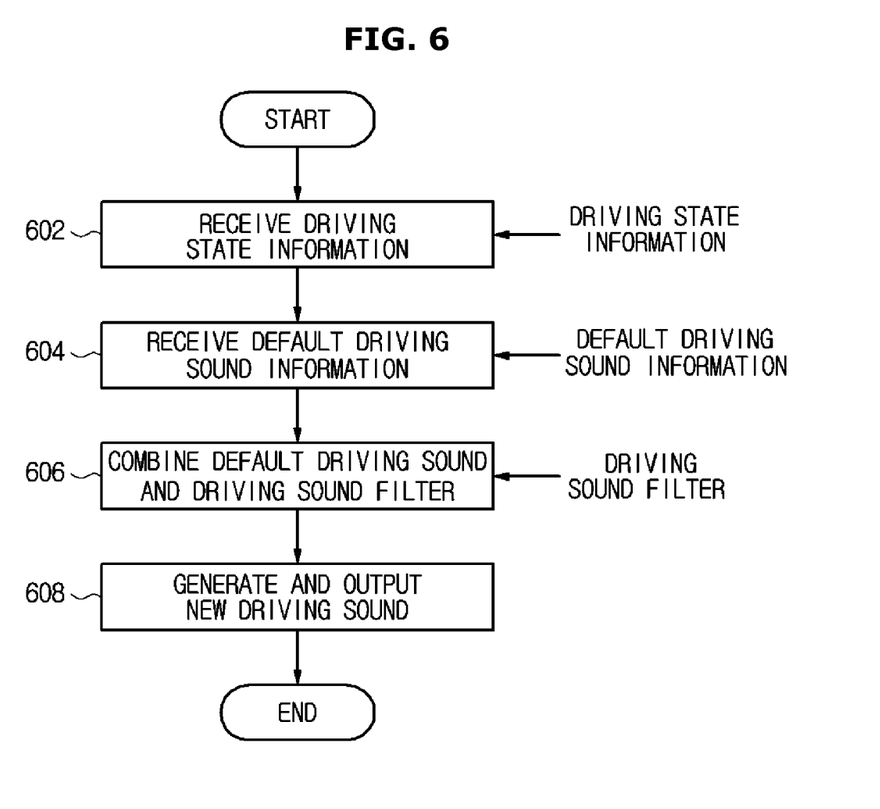
FIG. 6 is a flowchart showing a method of controlling a driving sound of a vehicle according to an embodiment of the present invention.

As shown in FIGS. 4, 5A and 5B, when the driving sound filter is completely generated and stored, the driving sound control unit 110 may be operated by selection of the driver 106 during actual running of the vehicle 100 to generate a new driving sound to which the driving sound filter has been applied. FIG. 6 is a flowchart showing a method of controlling a driving sound of a vehicle according to an embodiment of the present invention. The driving sound control unit 110 of the vehicle 100 may be operated to output a driving sound desired by the driver 106 in response to an operation of the driver 106 according to an embodiment of the present invention.

As shown in FIG. 6, when an operation of the driver 106 occurs in order to output the driving sound desired by the driver 106, the control unit 212 of the driving sound control unit 110 receives driving state information of the vehicle 100 from the driving state detection unit 218 (602). The control unit 212 receives default driving sound information corresponding to the current driving state of the vehicle 100 from the driving state information of the vehicle 100 (604). The control unit 212 combines the default driving sound according to the acquired default driving sound information with a driving sound filter stored in the filter storage unit 206 (606). That is, a new driving sound may be generated by passing the default driving sound through the driving sound filter to combine a characteristic of the driving sound filter with the default driving sound. When the new driving sound is generated, the generated driving sound may be output through a speaker, thus allowing the driver 106 of the passenger compartment 104 to listen to the new driving sound output through a speaker.

Figure 7:
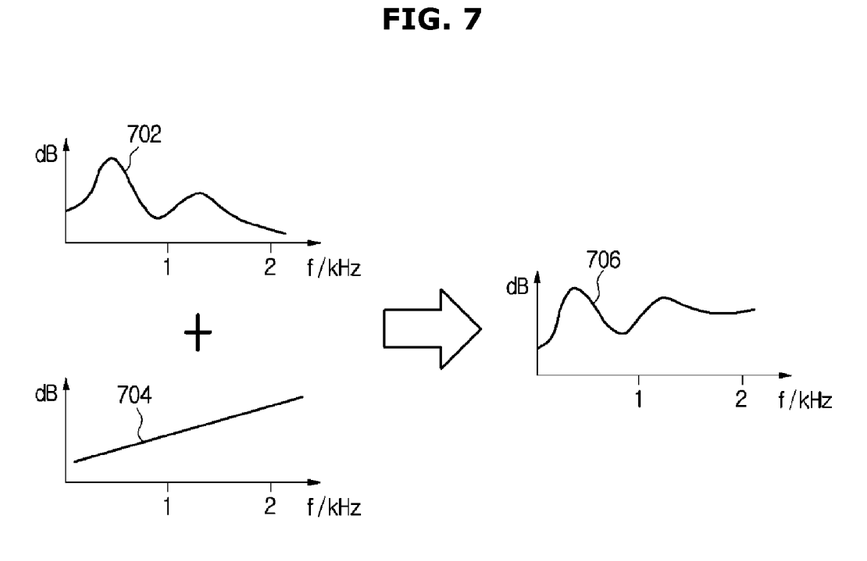
FIG. 7 is a view showing a method of generating a new driving sound by combining a default driving sound of a vehicle and a driving sound filter according to an embodiment of the present invention.

FIG. 7 is a view showing a method of generating a new driving sound by combining a default driving sound of a vehicle and a driving sound filter according to an embodiment of the present invention. In FIG. 7, a wave form designated by reference numeral 704 indicates a characteristic of a default driving sound considering a driving state of the vehicle 100, and a wave form designated by reference number 706 indicates a result obtained by passing the default driving sound 704 through the driving sound filter 702, that is, a new driving sound.

To provide a detailed description of FIG. 7 with reference to the above-described FIG. 2, when the vehicle 100 is running with a driving sound filter being stored in the filter storage unit 206, the control unit 212 generates the default driving sound 704 considering a driving state of the vehicle 100 on the basis of the driving state information of the vehicle 100 that is detected by the driving state detection unit 218. In this case, the control unit 212 does not output the default driving sound without any processing thereof, passes the default driving sound through the driving sound filter previously stored in the filter storage unit 206 to allow the default driving sound to reflect a unique characteristic of the driving sound filter, and then outputs the default driving sound considering the unique characteristic, thus allowing a new driving sound having a characteristic desired by the driver 106 to be generated and output.

As such, when the driver 106 is not satisfied with the default driving sound considering the driving state of the vehicle 100, the driver 106 can add his/her voice, someone's voice, a cry of a pet of the driver 106, or a cry of a wild animal preferred by the driver 106 to the driving sound of the vehicle 100, thus significantly increasing satisfaction during running of the vehicle 100.

According to an aspect, it is possible to significantly increase satisfaction of a driver during running of a vehicle by providing a driving sound of the vehicle having a characteristic desired by the driver.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A vehicle comprising:
   a voice signal inputter configured to receive a voice signal;
   a filter generator configured to extract a characteristic of the voice signal and generate a driving sound filter in consideration of the characteristic of the voice signal; and
   a driving sound controller configured to generate a default driving sound based on a driving state of the vehicle and generate a new driving sound obtained by applying the driving sound filter to the default driving sound, wherein the filter generator comprises a filter synthesizer configured to extract the characteristic of the voice signal by using at least one resonance frequency of the voice signal selected through spectral analysis of the voice signal and to generate the driving sound filter in consideration of the extracted characteristic of the voice signal.

2. The vehicle of claim 1, wherein the filter generator further comprises:
a filter storage configured to store the driving sound filter.

3. The vehicle of claim 1, wherein the driving sound controller comprises a driving state detector configured to detect a driving state of the vehicle.

4. The vehicle of claim 3, wherein the driving state detector comprises at least one of a revolutions-per-minute (RPM) sensor, a torque sensor, a throttle position sensor, an accelerator position sensor, and a wheel speed sensor.

5. The vehicle of claim 1, wherein the driving sound controller further comprises a controller configured to control generation of the default driving sound and generation of the new driving sound.

6. The vehicle of claim 1, wherein a level of the new driving sound is adjusted by adjusting decibels of the driving sound filter.

7. The vehicle of claim 1, wherein the voice signal inputter is a microphone.

8. The vehicle of claim 7, wherein the microphone includes at least one of a hands-free microphone, a voice control microphone for inputting a voice, and a microphone of a mobile communication terminal.

9. The vehicle of claim 1, wherein the driving sound filter is a finite impulse response (FIR) filter.

10. The vehicle of claim 1, wherein the driving sound filter is an infinite impulse response (IIR) filter.

11. The vehicle of claim 1, wherein the voice signal is a cry of a pet.

12. The vehicle of claim 1, wherein the voice signal is a cry of a wild animal.

13. A driving sound filter generation device of a vehicle comprising:
a filter synthesizer configured to extract a characteristic of a voice signal from at least one resonance frequency of the voice signal selected through spectral analysis of the voice signal and to generate a driving sound filter by using the extracted characteristic of the voice signal; and
a filter storage configured to store the driving sound filter.

14. The driving sound filter generation device of claim 13, wherein a level of the new driving sound is adjusted by adjusting decibels of the driving sound filter.

15. A method of controlling a driving sound of a vehicle, the method comprising:
receiving a voice signal;
extracting a characteristic of the received voice signal and generating a driving sound filter in consideration of the characteristic of the voice signal; and
generating a default driving sound based on a driving state of the vehicle and generating a new driving sound obtained by applying the driving sound filter to the default driving sound,
wherein the extracting the characteristic of the received voice signal comprises extracting the characteristic of the received voice signal by using at least one resonance frequency of the voice signal selected through spectral analysis of the voice signal, and the generating of the driving sound filter comprises generating the driving sound filter by using the extracted characteristic of the voice signal.

16. The method of claim 15, further comprising storing the driving sound filter.

17. The method of claim 15, wherein a level of the new driving sound is adjusted by adjusting decibels of the driving sound filter.

* * * * *